(12) United States Patent
Merchant et al.

(10) Patent No.: US 8,854,115 B2
(45) Date of Patent: Oct. 7, 2014

(54) PREVENTING ELECTRONIC DEVICE COUNTERFEITS

(71) Applicant: LSI Corporation, San Jose, CA (US)

(72) Inventors: Sailesh M. Merchant, Macungie, PA (US); Kouros Azimi, Center Valley, PA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/897,165

(22) Filed: May 17, 2013

(65) Prior Publication Data

US 2014/0253222 A1    Sep. 11, 2014

Related U.S. Application Data

(60) Provisional application No. 61/772,889, filed on Mar. 5, 2013.

(51) Int. Cl.
*H01H 37/76* (2006.01)
*H01H 85/04* (2006.01)

(52) U.S. Cl.
CPC .................................. *H01H 85/04* (2013.01)
USPC ........................................................ 327/525

(58) Field of Classification Search
CPC .............. H01L 2223/54433; H01L 2223/5444
USPC .................................................. 327/524, 525
See application file for complete search history.

(56) References Cited

U.S. PATENT DOCUMENTS

| | | | |
|---|---|---|---|
| 6,396,759 B1 | 5/2002 | Lesher | |
| 7,210,634 B2 * | 5/2007 | Sapiro | 235/492 |
| 8,242,831 B2 | 8/2012 | Tong et al. | |
| 8,683,210 B2 * | 3/2014 | Devadas | 713/185 |
| 2012/0069119 A1 | 3/2012 | Teggatz et al. | |
| 2012/0216050 A1 | 8/2012 | Barner et al. | |
| 2013/0046981 A1 | 2/2013 | Ducharme et al. | |

OTHER PUBLICATIONS

Gorman, Celia, "The Financial Risks of Counterfeit Semiconductors", printed from Blogs//The Risk Factor, Apr. 9, 2012, 1 page.
Lee, Jolie, "DoD Testing Plant DNA to Fight Counterfeit Parts", Feb. 9, 2012, 1 page.

* cited by examiner

*Primary Examiner* — Jeffrey Zweizig
(74) *Attorney, Agent, or Firm* — Suiter Swantz pc llo

(57) ABSTRACT

Systems and methods for authenticating electronic devices may perform one or more operations including, but not limited to: receiving at least one code associated with an authorization to perform one or more manufacturing life-cycle operations for at least one electronic device; and blowing one or more fuses of the at least one electronic device according to the at least one code associated with an authorization to perform one or more manufacturing life-cycle operations for the at least one electronic device.

14 Claims, 3 Drawing Sheets

PREVENTING ELECTRONIC DEVICE COUNTERFEITS

CROSS-REFERENCE TO RELATED APPLICATION

The present Application claims the benefit under 35 U.S.C. 119(e) of U.S. Provisional Patent Application Ser. No. 61/772,889 which is hereby incorporated by reference in its entirety.

BACKGROUND

Various techniques may be employed to verify authenticity of electronic devices. However, many such techniques require rigorous comparison to a known authentic electronic device.

SUMMARY

To reduce the possibility of counterfeiting electronic devices (e.g. integrated circuits (ICs), microprocessors, memory devices, programmable logic devices, transistors, and the like), systems and methods for preventing device counterfeit are described herein. During the manufacturing life-cycle of an electronic device, at various steps measures may be implemented to check the authenticity of the electronic device (e.g., at wafer level processing, wafer test, device assembly, package testing and the like). For example, systems and methods for authenticating electronic devices may perform one or more operations including, but not limited to: receiving at least one code associated with an authorization to perform one or more manufacturing life-cycle operations for at least one electronic device; and blowing one or more fuses of the at least one electronic device according to the at least one code associated with an authorization to perform one or more manufacturing life-cycle operations for the at least one electronic device.

BRIEF DESCRIPTION OF THE FIGURES

The numerous advantages of the disclosure may be better understood by those skilled in the art by referencing the accompanying figures in which.

DETAILED DESCRIPTION

The present disclosures provide systems and methods for authenticating electronic devices. In order to verify that electronic devices are produced under the authorization (e.g. licensure under one or more license agreements) of an entity having a proprietary right (e.g. a patent right, trade secret right, copyright, and the like) or other financial interest in maintaining the exclusivity of production of the electronic device, various mechanisms may be employed to authenticate an electronic device.

Figure 1:
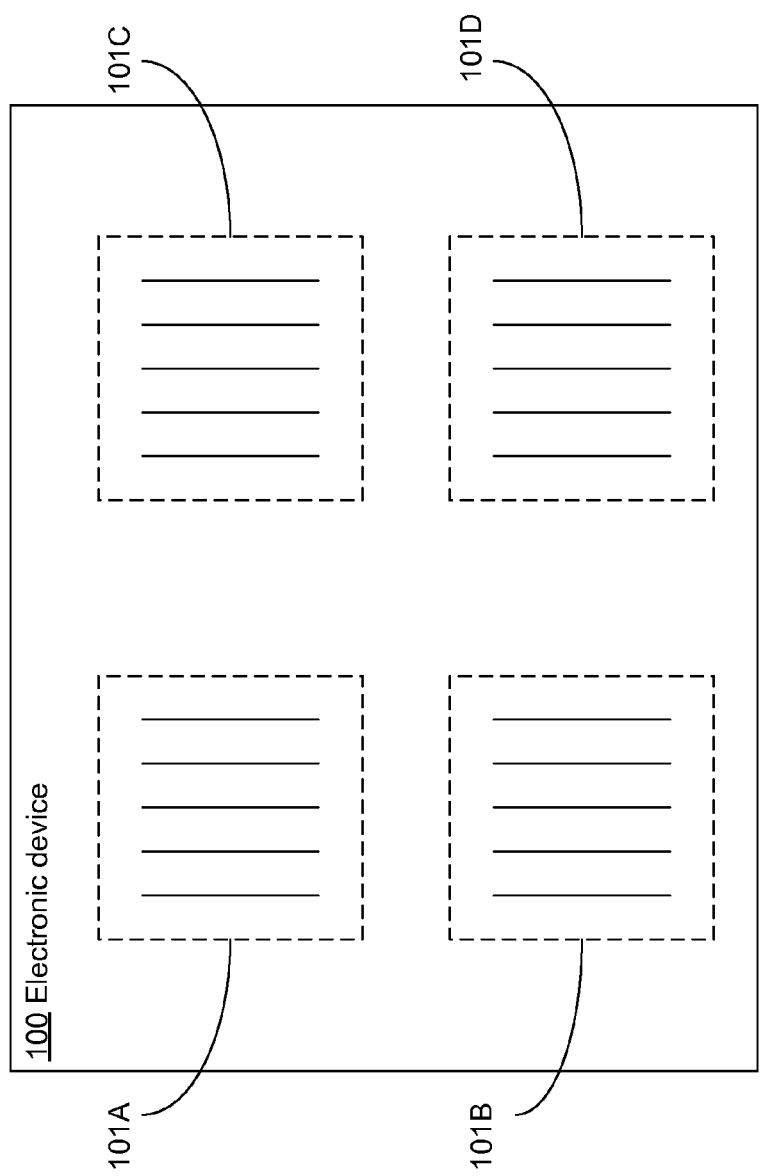
FIG. 1 illustrates an electronic device configured for authentication.

Referring to FIG. 1, an electronic device 100 may include one or more fuse elements 101 configured to be selectively blown according to one or more authorization codes associated with a particular phase of the manufacturing life-cycle of the electronic device 100. A given set of fuse elements 101 may be associated with particular phase of the manufacturing life-cycle of the electronic device 100. For example, a first set of fuse elements 101A may be associated with a fabrication phase of the manufacturing life-cycle of the electronic device 100. Further a second set of fuse elements 101B may be associated with a device testing and verification phase of the manufacturing life-cycle of an electronic device 100. Still further, a third set of fuse elements 101C may be associated with an assembly of a package including the electronic device 100. Still further, a fourth set of fuse elements 101D may be associated with an assembly of a circuit board including a package containing the electronic device 100. While described herein as distinct sets of independent fuse elements 101 dedicated to specific portions of the manufacturing life-cycle of the electronic device 100, it is fully contemplated that the fuse elements 101 associated with a given manufacturing life-cycle phase may be networked together (e.g. in series or parallel) with additional fuse elements 101 associated with that manufacturing life-cycle phase or any other manufacturing life-cycle phase.

The fuse elements 101 of an electronic device 100 may be operably coupled to circuitry configured to selectively blow one or more of the fuse elements 101. For example, U.S. Pat. No. 6,396,759 provides an exemplary system for selectively controlling a set of fuses associated with an integrated circuit for the purpose of trimming the circuit by blowing one or more fuse elements. Such a system may be repurposed for selectively blowing one or more of the fuse elements 101 according to an authorization code as described below.

Figure 2:
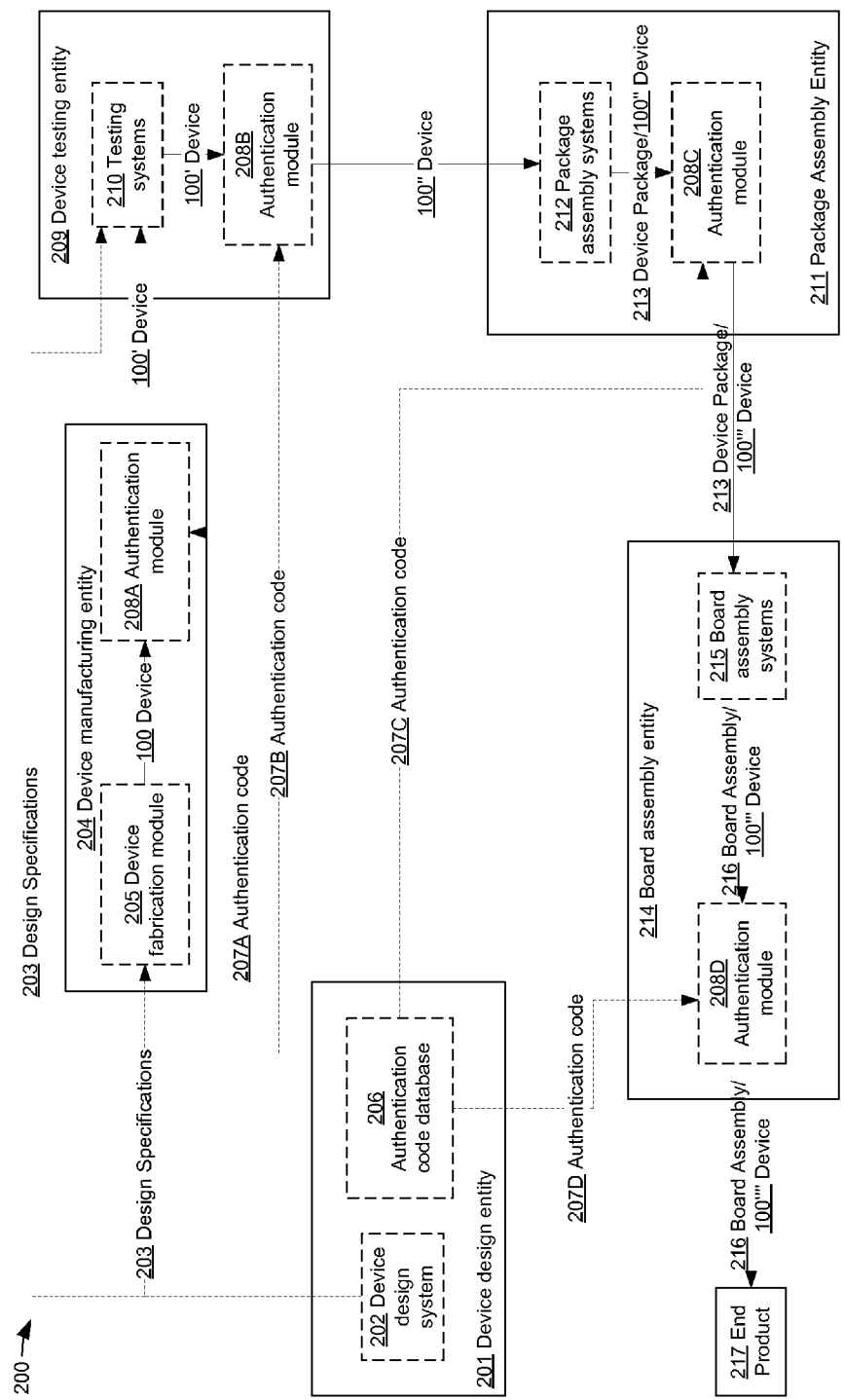
FIG. 2 illustrates a system for electronic device authentication.

Referring to FIG. 2, a system 200 for authentication of an electronic device is illustrated. The system 200 may include an electronic device design entity 201. The electronic device design entity 201 may include one or more design systems for the design of an electronic device 100. For example, the electronic device design entity 201 may employ a device design system 202 (e.g. a computer-aided design (CAD) system such as a SPICE design and simulation system) to generate electronic device design specifications 203. These design specifications 203 may be transmitted (e.g. communications network infrastructure such as the internet) to a device manufacturing entity 204. The device manufacturing entity 204 may include a device fabrication module 205 employing device fabrication systems (e.g. deposition, removal, patterning, electrical property modification, etc.) to create an electronic device 100 (e.g. a semiconductor device) according to the design specifications 203.

As noted above, it may be the case that the electronic device design entity 201 (or any other entity) may have an interest in maintaining the exclusivity of production of the electronic device 100. As such, the electronic device design entity 201 may maintain an authentication code database 206. The authentication code database 206 may store one or more authentication codes 207 associated with one or more phases of the manufacturing life-cycle of an electronic device 100. Further, in a case where multiple vendors may be carrying out operations for a given phase of the manufacturing life-cycle of an electronic device 100, in addition to being life-cycle phase specific, the authentication code 207 may also be vendor specific.

Still further, any number of electronic device design entities 201 may provide independent authentication codes 207 (e.g. authentication code 207A, authentication code 207B, authentication code 207C, authentication code 207D) to the respective entities of the manufacturing life-cycle of an electronic device 100 (e.g. a device manufacturing entity 204, a device testing entity 209, a package assembly entity 211, a board assembly entity 214, and the like).

Figure 3:
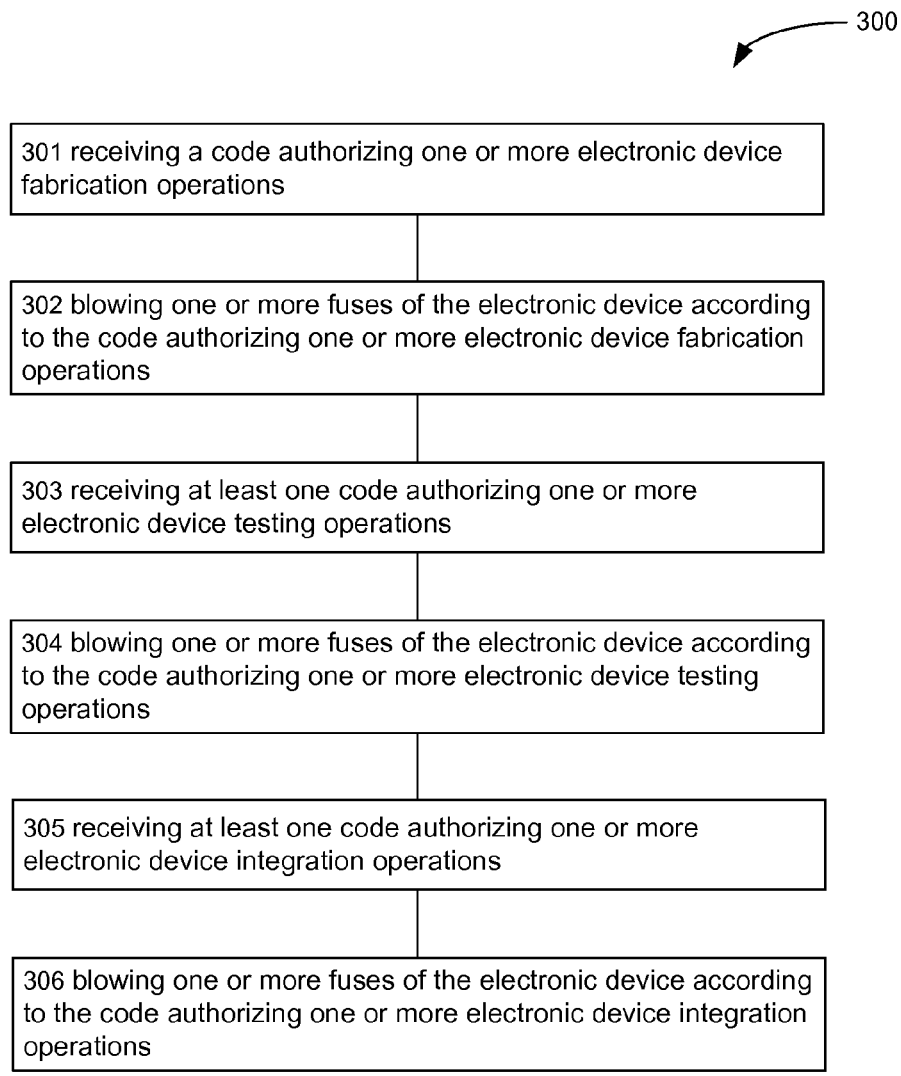
FIG. 3 illustrates a method for electronic device authentication.

Referring to FIG. 3, an operational flow diagram for a method 300 for authenticating electronic devices 100 is illustrated. At operations 301 and 302, the device manufacturing entity 204 may receive an authentication code 207A and blow one or more fuse elements 101A of the electronic device 100 according to the authentication code 207A.

For example, referring again to FIG. 2, following creation of an electronic device 100 according to the design specifications 203 by the device fabrication module 205, the electronic device 100 may be transferred to an authentication module 208A. The authentication module 208A may include circuitry (e.g. such as that described in U.S. Pat. No. 6,396,759) which may be operably coupled to an electronic device 100 to selectively blow one or more of the fuse elements 101A of the electronic device 100. Further, the authentication module 208A may be provided with and/or retrieve an authentication code 207A from the authentication code database 206 of the electronic device design entity 201. The authentication module 208A may be configured to map the authentication code 207A to a fuse blowing scheme to be applied to the fuse elements 101A of the electronic device 100 that are associated with the fabrication phase operations of the manufacturing life-cycle. For example, in a simple case, the authentication code 207A may be an alpha-numerical value that may be converted to a binary value by the authentication module 208A. The fuse elements 101A of the electronic device 100 may be blown according to that binary value (e.g. fuses associated with a "1" value are blown; fuses associated with a "0" value are maintained, or vice versa). The authentication module 208A may apply voltages to those selected fuse elements 101A sufficient to blow those fuse elements 101B thereby encoding the authentication code 207A in the electronic device 100 to generate an electronic device 100' that is authenticated for the device fabrication phase of the electronic device 100.

The system 200 may further include a device testing entity 209. The device testing entity 209 may include one or more device testing systems 210 (e.g. scatterometry verification testing, imaging testing, functionality testing, and other means of testing know to one skilled in the art) configured to determine compliance of the electronic device 100' with the design specifications 203. Following confirmation of compliance of the electronic device 100' with the design specifications 203, the electronic device 100' may be provided to an authentication module 208B.

Referring again to FIG. 3, at operations 303 and 304, the device testing entity 209 may receive an authentication code 207B and blow one or more fuse elements 101B of the electronic device 100' according to the authentication code 207B.

For example, referring again to FIG. 2, authentication module 208B may include circuitry which may be operably coupled to an electronic device 100' to selectively blow one or more of the fuse elements 101B of the electronic device 100'. Further, the authentication module 208B may be provided with and/or retrieve an authentication code 207B from the authentication code database 206. The authentication module 208B may be configured to map the authentication code 207B to a fuse blowing scheme to be applied to the fuse elements 101B of the electronic device 100 that are associated with the testing phase of the manufacturing life-cycle. For example, in a simple case, the authentication code 207B may be an alpha-numerical value that may be converted to a binary value by the authentication module 208B. The fuse elements 101B of the electronic device 100' may be blown according to that binary value (e.g. fuses associated with a "1" value are blown; fuses associated with a "0" value are maintained). The authentication module 208B may apply voltages to those selected fuse elements 101B sufficient to blow those fuse elements 101B thereby encoding the authentication code 207B in the electronic device 100' to generate an electronic device 100" that is authenticated for the device testing phase of the manufacturing life-cycle.

The system 200 may further include a package assembly entity 211. The package assembly entity 211 may include one or more package assembly systems 212 (e.g. wire-bond or flip chip integration systems) configured to incorporate the electronic device 100" into a package including one or more additional previously authenticated electronic devices 100" to form an authenticated device package 213. Following integration of the electronic devices 100" into the device package 213, the device package 213 may be provided to an authentication module 208C.

Referring again to FIG. 3, at operations 305 and 306, the package assembly entity 211 may receive an authentication code 207C and blow one or more fuse elements 101C of the electronic device 100" according to the authentication code 207C.

For example, referring again to FIG. 2, authentication module 208C may include circuitry which may be operably coupled to one or more electronic devices 100" to selectively blow one or more of the fuse elements 101C of the electronic devices 100". Further, the authentication module 208C may be provided with and/or retrieve an authentication code 207C from the authentication code database 206. The authentication module 208C may be configured to map the authentication code 207C to a fuse blowing scheme to be applied to the fuse elements 101C of the electronic devices 100" that are associated with the package assembly phase of the manufacturing life-cycle. For example, in a simple case, the authentication code 207C may be an alpha-numerical value that may be converted to a binary value by the authentication module 208C. The fuse elements 101C of the electronic device 100" may be blown according to that binary value (e.g. fuses associated with a "1" value are blown; fuses associated with a "0" value are maintained). The authentication module 208C may apply voltages to those selected fuse elements 101C sufficient to blow those fuse elements 101C thereby encoding the authentication code 207C in the electronic device 100" to generate a device package 213 including electronic devices 100'" that are authenticated for the package assembly phase of the manufacturing life-cycle.

The system 200 may further include a board assembly entity 214. The board assembly entity 214 may include one or more board assembly systems 215 configured to incorporate a device package 213 including electronic devices 100'" with one or more additional device packages 213 including authenticated electronic devices 100'" to form an board assembly 216. Following integration of the device packages 213 into the board assembly 216, the board assembly 216 may be provided to an authentication module 208D.

Referring again to FIG. 3, in another embodiment, at operations 305 and 306, the board assembly entity 214 may receive an authentication code 207D and blow one or more fuse elements 101D of the electronic device 100'" according to the authentication code 207D.

For example, referring again to FIG. 2, The authentication module 208D may include circuitry which may be operably coupled to one or more electronic devices 100'" of the board assembly 216 to selectively blow one or more of the fuse elements 101D of the electronic devices 100'". Further, the authentication module 208D may be provided with and/or retrieve an authentication code 207D from the authentication code database 206. The authentication module 208D may be configured to map the authentication code 207D to a fuse blowing scheme to be applied to the fuse elements 101D of the electronic devices 100''' that are associated with the board assembly phase of the manufacturing life-cycle. For example, in a simple case, the authentication code 207D may be a may be an alpha-numerical value that may be converted to a binary value by the authentication module 208D. The fuse elements 101D of the electronic device 100''' may be blown according to that binary value (e.g. fuses associated with a "1" value are blown; fuses associated with a "0" value are maintained). The authentication module 208D may apply voltages to those selected fuse elements 101D sufficient to blow those fuse elements 101D thereby encoding the authentication code 207D in the electronic device 100" to generate electronic devices 100"" that are authenticated for the board assembly phase of the manufacturing life-cycle.

It will be noted that the above-described methodologies for authentication of electronic devices 100 are extensible to any number of manufacturing life-cycle phases (e.g. integration of a board assembly 216 into an end product 217 such as a cell phone, smart phone, tablet computer, laptop computer, desktop computer, storage device, server device, network device, appliance, vehicle, or any other integrated electronic device; shipping between various manufacturing life-cycle entities; etc.) in addition to those described above.

Following the manufacturing of electronic devices 100 according to the above-described methodologies, it may be possible to authenticate such devices by comparison of the current state of their fuse elements 101 with the authentication codes 207 maintained by electronic device design entity 201. For example, examination (e.g. by scatterometry testing, verification circuitry, visual or machine inspection, and the like) of the fuse elements 101 of electronic devices 100 modified according to authentication codes 207 at any point during the manufacturing life-cycle (e.g. electronic device 100', electronic device 100", electronic device 100''', electronic device 100'''', etc.) may reveal the degree to which those fuse elements 101 have been modified during one or more phases of a manufacturing life-cycle of an electronic device 100. Such modifications may be compared to those designated by the electronic device design entity 201 and reflected in the authentication codes 207 to verify the authenticity of a given electronic device 100 as having originated from the electronic device design entity 201.

Further, it will be noted that the authentication codes 207 provided by an electronic device design entity 201 to an entity at a given phase in the manufacturing life-cycle of may be unique to the electronic device design entity 201 (e.g. in a case of multiple instances of system 200, each electronic device design entity 201 may provide authentication codes 207 distinct from any other electronic device design entity 201), unique to the design specifications 203 for the electronic device 100 provided by the electronic device design entity 201 (e.g. in a case of use of multiple design specifications 203 in a common system 200, each of the design specifications 203 may be associated with distinct authentication codes 207), unique to a phase of the manufacturing life-cycle (e.g. in a case where design specifications 203 are provided to multiple manufacturing life-cycle entities at a common phase of the manufacturing life-cycle (e.g. fabrication), common authentication codes 207 may be provided to all such entities), unique to specific vendor at a given phase of the manufacturing life-cycle (e.g. in a case where design specifications 203 are provided to multiple manufacturing life-cycle entities at a common phase of the manufacturing life-cycle (e.g. fabrication), distinct authentication codes 207 may be provided to each entities), unique to a lot of electronic devices 100, unique to a single electronic device 100 or any other specified association between an authentication code 207 and an electronic device 100.

Further, it will be noted that the above described methodology for authentication of electronic devices 100 is extensible to any number of electronic device design entities 201 which may provide independent authentication codes 207 associated with their design specifications 203 and resulting electronic devices 100.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It may be the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those skilled in the art will recognize that the state of the art has progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those skilled in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

What is claimed:

1. A method for authenticating electronic devices, comprising:
   receiving at least one code associated with an authorization to perform one or more manufacturing life-cycle operations for at least one electronic device; and
   blowing one or more fuses of the at least one electronic device according to the at least one code associated with an authorization to perform one or more manufacturing life-cycle operations for the at least one electronic device.

2. The method of claim 1, wherein the one or more manufacturing life-cycle operations for an electronic device include:
   one or more fabrication operations for the electronic device; one or more device testing and verification operations for the electronic device; one or more package assembly operations including the electronic device; and one or more circuit board assembly operations including the electronic device.

3. The method of claim 1, wherein the at least one code associated with an authorization to perform one or more manufacturing life-cycle operations for at least one electronic device includes:
   at least one code unique to an entity transmitting the at least one code.

4. The method of claim 1, wherein the at least one code associated with an authorization to perform one or more manufacturing life-cycle operations for at least one electronic device includes:
   at least one code unique to an entity receiving the at least one code.

5. The method of claim 1, wherein the at least one code associated with an authorization to perform one or more manufacturing life-cycle operations for at least one electronic device includes:
   at least one code unique to a plurality of electronic devices.

6. The method of claim 1, wherein the at least one code associated with an authorization to perform one or more manufacturing life-cycle operations for at least one electronic device includes:
   at least one code unique to an electronic device.

7. The method of claim 1, wherein the authorization to perform one or more manufacturing life-cycle operations for at least one electronic device includes:
   an authorization to perform one or more manufacturing life-cycle operations for at least one electronic device under at least one licensing agreements governing at least one proprietary aspect of the one or more manufacturing life-cycle operations.

8. A system for authenticating electronic devices, comprising:
   a processing device configured for receiving at least one code associated with an authorization to perform one or more manufacturing life-cycle operations for at least one electronic device; and
   circuitry configured for blowing one or more fuses of the at least one electronic device according to the at least one code associated with an authorization to perform one or more manufacturing life-cycle operations for the at least one electronic device.

9. A method for authenticating electronic devices, comprising:
   transmitting at least one code associated with an authorization to perform one or more manufacturing life-cycle operations for at least one electronic device; and
   verifying that one or more one or more fuses of at least one electronic device are blown according to the at least one code associated with an authorization to perform one or more operations of a manufacturing life-cycle phase of the at least one electronic device.

10. The method of claim 9, wherein the transmitting at least one code associated with an authorization to perform one or more manufacturing life-cycle operations for at least one electronic device includes:
    transmitting a first code associated with an authorization to perform a manufacturing life-cycle operation for at least one electronic device to a first receiver; and
    transmitting a second code associated with an authorization to perform the manufacturing life-cycle operation for at least one electronic device to a second receiver.

11. The method of claim 9, wherein the one or more manufacturing life-cycle operations for an electronic device include:
    one or more fabrication operations for the electronic device; one or more device testing and verification operations for the electronic device; one or more package assembly operations including the electronic device; and one or more circuit board assembly operations including the electronic device.

12. The method of claim 9, wherein the at least one code associated with an authorization to perform one or more manufacturing life-cycle operations for at least one electronic device includes:
    at least one code unique to the electronic device.

13. The method of claim 9, wherein the authorization to perform one or more manufacturing life-cycle operations for at least one electronic device includes:
    an authorization to perform one or more manufacturing life-cycle operations for at least one electronic device under at least one licensing agreements governing at least one proprietary aspect of the one or more manufacturing life-cycle operations.

14. A system for authenticating electronic devices, comprising:
    a processing device configured for:
       transmitting at least one code associated with an authorization to perform one or more manufacturing life-cycle operations for at least one electronic device; and
    a verification device configured for:
       verifying that one or more one or more fuses of at least one electronic device are blown according to the at least one code associated with an authorization to perform one or more operations of a manufacturing life-cycle phase of the at least one electronic device.

* * * * *